No. 718,863. PATENTED JAN. 20, 1903.
A. B. NORRIS.
MACHINE FOR MAKING PACKING RINGS.
APPLICATION FILED NOV. 6, 1902.
NO MODEL. 8 SHEETS—SHEET 1.

Witnesses
A. C. Gordon.
H. R. Selden.

Inventor
Arthur B. Norris,
By Geo. B. Selden,
Attorney

No. 718,863. PATENTED JAN. 20, 1903.
A. B. NORRIS.
MACHINE FOR MAKING PACKING RINGS.
APPLICATION FILED NOV. 6, 1902.
NO MODEL. 8 SHEETS—SHEET 2.

Fig. 3.

Witnesses
A. C. Gordon.
H. R. Selden,

Inventor
Arthur B. Norris,
By Geo. B. Selden,
Attorney

No. 718,863. PATENTED JAN. 20, 1903.
A. B. NORRIS.
MACHINE FOR MAKING PACKING RINGS.
APPLICATION FILED NOV. 6, 1902.
NO MODEL. 8 SHEETS—SHEET 3.

Witnesses
A. C. Gordon,
H. R. Selden.

Inventor
Arthur B. Norris,
By Geo. B. Selden,
Attorney.

Fig. 5.

No. 718,863. PATENTED JAN. 20, 1903.
A. B. NORRIS.
MACHINE FOR MAKING PACKING RINGS.
APPLICATION FILED NOV. 6, 1902.
NO MODEL. 8 SHEETS—SHEET 7.

WITNESSES:
A. C. Gordon,
H. R. Selden.

INVENTOR
Arthur B. Norris,
BY Geo. B. Selden,
Attorney

No. 718,863. PATENTED JAN. 20, 1903.
A. B. NORRIS.
MACHINE FOR MAKING PACKING RINGS.
APPLICATION FILED NOV. 6, 1902.
NO MODEL. 8 SHEETS—SHEET 8.

UNITED STATES PATENT OFFICE.

ARTHUR B. NORRIS, OF ROCHESTER, NEW YORK.

MACHINE FOR MAKING PACKING-RINGS.

SPECIFICATION forming part of Letters Patent No. 718,863, dated January 20, 1903.

Application filed November 6, 1902. Serial No. 130,306. (No model.)

*To all whom it may concern:*

Be it known that I, ARTHUR B. NORRIS, a citizen of the United States, residing at Rochester, in the county of Monroe, in the State of New York, have invented an Improved Machine for Making Packing-Rings, of which the following is a specification, reference being had to the accompanying drawings.

My invention relates to an improved machine for cutting packing-rings automatically from a suitable fabric, capable also of being applied to other analogous uses.

My improvements are fully described and illustrated in the following specification and the accompanying drawings, the novel features thereof being specified in the claims annexed to the said specification.

In the accompanying drawings.

Figure 1:
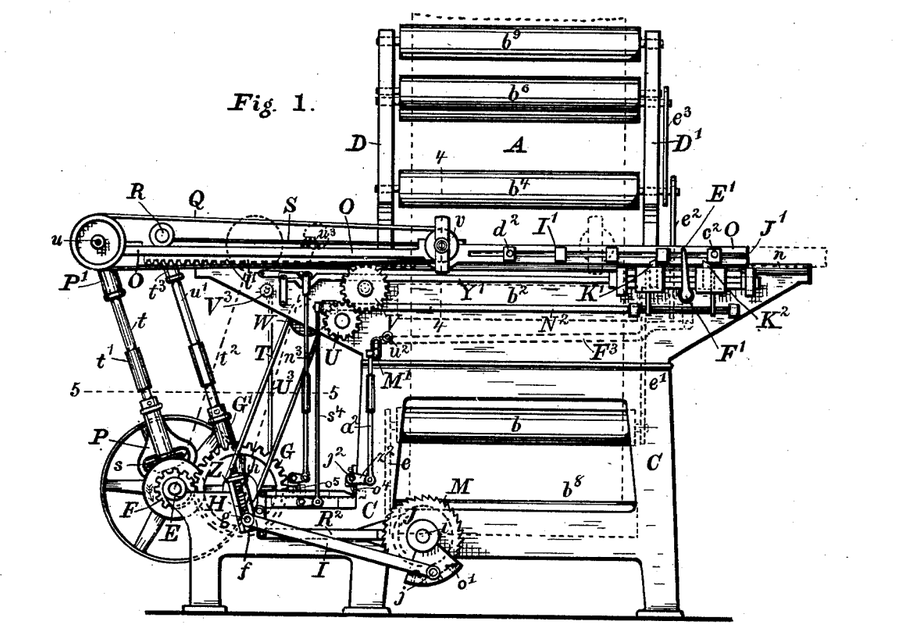
Figure 1 is a front elevation.
Figure 2:
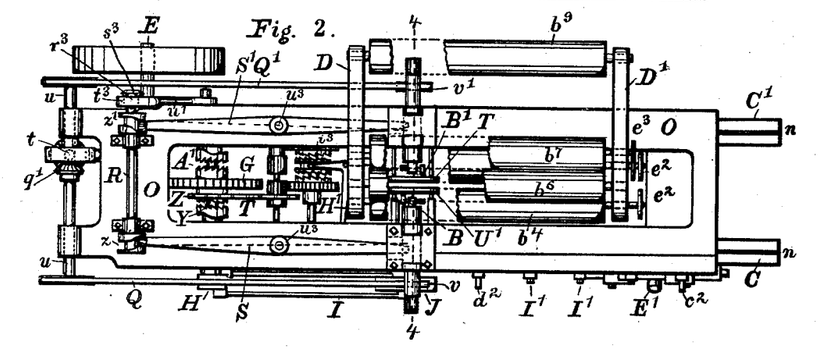
Fig. 2 is a plan view.

The general appearance of my improved machine for cutting packing-rings will be understood from Figs. 1 and 2.

Figure 4:
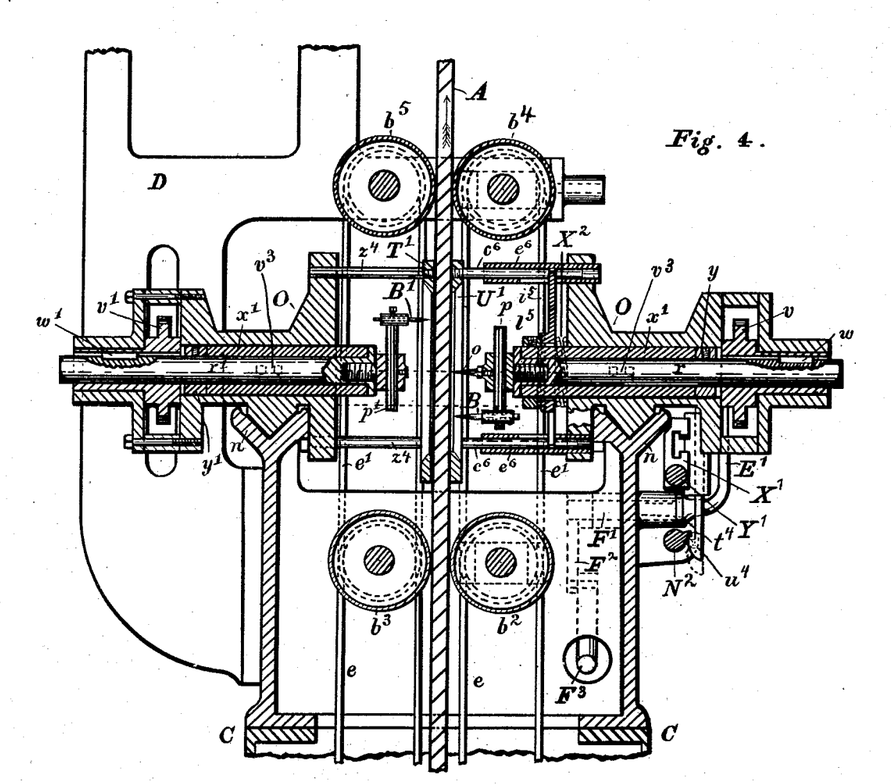
Fig. 4 is a partial transverse vertical section on the line 4 4, Figs. 1 and 2, showing the revolving cutters.
Figures 12, 13, 14, 15:
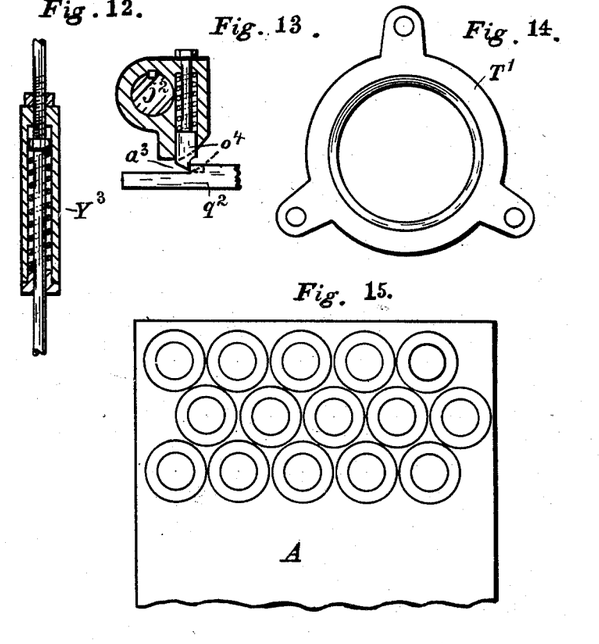
Fig. 12 represents the adjustable spring connection for the pitmen.
Fig. 13 represents the trip for unlocking the clutch.
Fig. 14 represents the collar or guard surrounding the revolving cutters.
Fig. 15 represents the fabric and the rings cut therefrom.

The fabric A is intermittently fed through the machine and subjected to the action of revolving cutters B B', Figs. 2 and 4, which successively cut the rings from the sheet in rows, as indicated in Fig. 15. The principal functions necessary to the performance of the required operations are, aside from the feeding of the fabric from one row to the next, the advance and return of the revolving cutters from one ring to the next in the same row and the clamping and release of the fabric around the cutters, the various mechanisms being properly timed and adapted to perform various minor functions.

C C' represent the framework of the machine, and D D' extension-arms which support the fabric-feed rolls. E is the main driving-shaft, from which motion is imparted to the operative parts of the machine.

Figure 5:
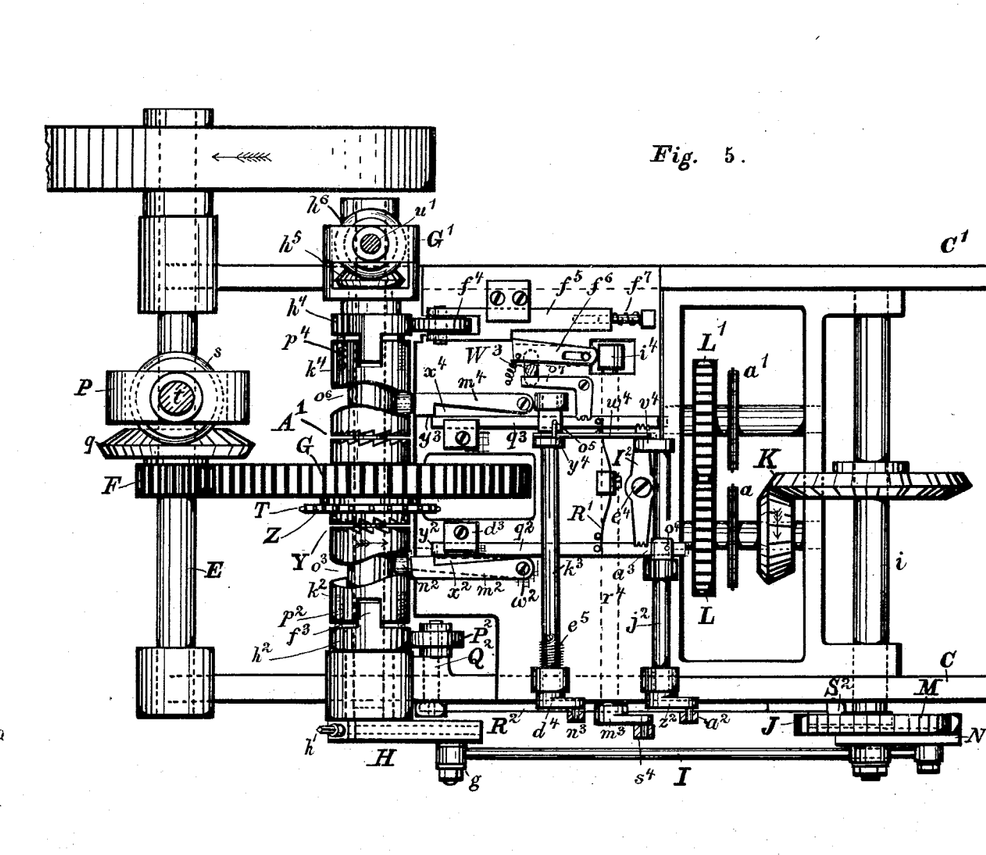
Fig. 5 is a partial plan view showing the parts below the line 5 5, Fig. 1.

The mechanism for advancing the fabric from one row of rings to the next consists, essentially, of the pinion F, Fig. 5, on the shaft E, the gear G, which operates the crank H, the connecting-rod I, the ratchet device J, the bevels K, the gears L L', and the sprocket-wheels $a$ $a'$. The fabric-feeding rolls $b$ $b'$ $b^2$ $b^3$ $b^4$ $b^5$ $b^6$ $b^7$ $b^8$ $b^9$ are arranged to feed the fabric A through the machine in the path indicated in Fig. 3. These feed-rolls are supported in suitable bearings in the frame and the extension-arms D D'. The rollers on one side of the fabric are mounted in movable journal-boxes $c$, Fig. 3, provided with springs $d$, which permit the rolls to open for different thicknesses of fabric, while retaining their grip thereon.

$b^6$ $b^8$ $b^9$ are idlers or guide-rolls.

Figure 3:
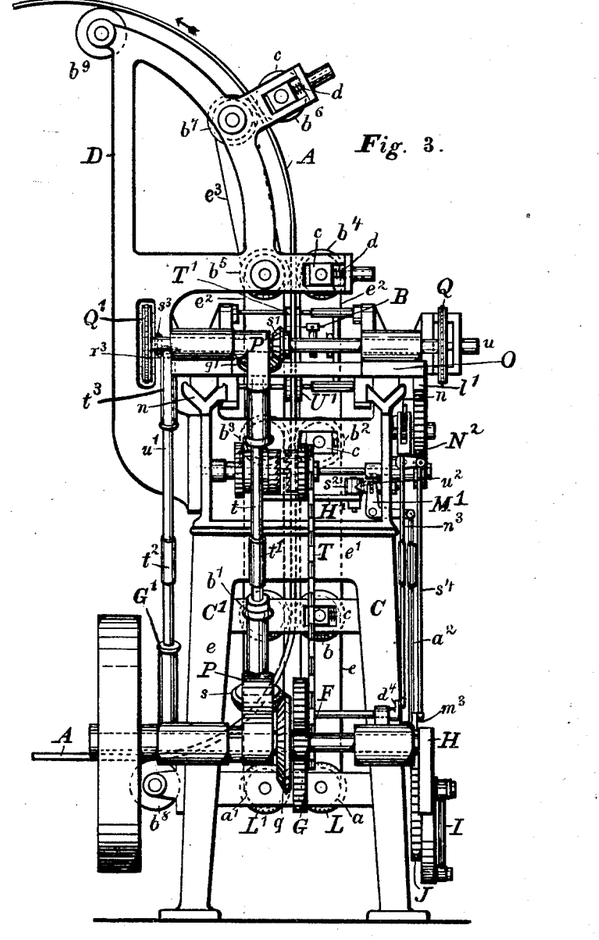
Fig. 3 is an end elevation as seen from the left in Fig. 1.

$e$ $e$, Figs. 1 and 3, represent chains by which the movement of the sprockets $a$ $a'$, Fig. 5, is transmitted to corresponding sprockets on the shafts of the feed-rollers $b$ $b'$, and $e'$ $e^2$ $e^3$ are chains by which the rollers $b^2$ $b^3$ $b^4$ $b^5$ $b^7$ are similarly driven. The crank H makes a complete revolution for every advance of the fabric from row to row of the rings.

For rings of different sizes the advance of the fabric is varied in the following manner: The crank H consists of a slotted bar having a block $f$, Fig. 1, carrying the crank-pin $g$ and arranged to slide in the groove. The connection I is pivoted on the pin $g$, and the block $f$ is made adjustable lengthwise in the slot by the screw $h$, so that provision is made by shifting the block for adjusting the throw of the ratchet J, and thereby changing the amount of feed motion imparted to the fabric.

Figure 8:
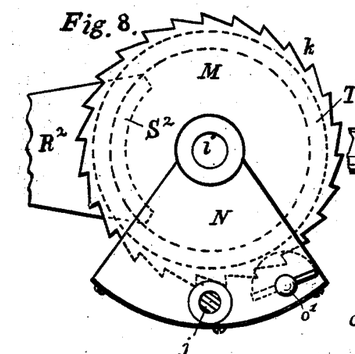
Fig. 8 is an outside view of the variable ratchet for feeding the fabric.
Figures 9, 10:
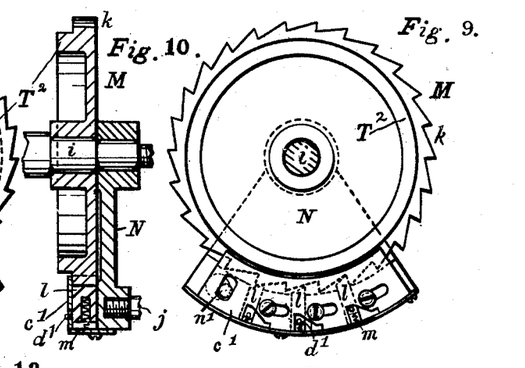
Fig. 9 is an inside view of the same.
Fig. 10 is a section of the same.

The construction of the ratchet will be understood from Figs. 8, 9, and 10. M is a ratchet-wheel provided with any suitable number of teeth, secured on the shaft $i$, which drives the bevels K, Fig. 5, and so, through the gears L L' and sprockets $a\ a'$, transmits movement to the feed-rollers. N is a segment arranged to vibrate freely on the end of the shaft $i$, receiving its motion from the connecting-rod I, pivoted to it at $j$. The segment N is provided with a series of pawls arranged closer together than the teeth of the ratchet-wheel M. These pawls are shown in dotted lines at $l$, Fig. 9, being arranged to be pressed inward by the springs $m$. By the use of a number of pawls having their points nearer each other than the points of the teeth $k$ I secure more accurate movements of the wheel M than the coarser teeth would give. To throw off the feed entirely, I employ an eccentric $n'$, operated by a handle $o'$, Fig. 8. The eccentric projects into a slot in the plate $c'$, which is provided with a series of inclines bearing against pins $d'$ in the pawls, so that when the plate is shifted by turning the handle $o'$ the pawls are all withdrawn from engagement with the teeth of the ratchet.

Having described the mechanism by which the fabric is intermittently fed forward between the cutting of each row of rings and held stationary during such cutting operation and also how the feed movement of the fabric is varied to suit rings of different diameters, I will now proceed to describe the mechanism for supporting and driving the revolving cutters, for advancing them so they cut into the fabric, for withdrawing them therefrom, and for shifting them laterally, so as to cut the successive rings in each row.

Suitable ways $n\ n$ are formed on the frames C C', and a traveling carriage O is arranged to reciprocate on these ways. This carriage supports the revolving cutters B B' and the mechanism for advancing them against and withdrawing them from the fabric, for clamping the fabric immediately outside the cutters, and the carriage also actuates the various clutches and intermediate mechanism employed to operate the parts in the requisite relative succession. From Fig. 2 it will be seen that the carriage O is practically an open frame, the fabric passing through the opening in it. Centrally on opposite sides the carriage is provided with suitable journal-boxes supporting the spindles $r\ r'$ of the revolving cutters B B'. On their inner ends the spindles $r\ r'$ are provided with suitable bosses, through which pass the transverse arms $p\ p'$, which carry the knives, which may be of any suitable shape. The arms $q\ p'$ are adjustable in the bosses by means of set-screws, and the knives are adjustable in the ends of the arms, so that provision is made for cutting any sizes of rings and for making any desired depth of cut from either side of the fabric. One knife cuts the outside of the ring and the other the inside. One of the cutters may be provided with a spur or point $o$, Fig. 4, by which the central disks removed from the rings are centered, so as to adapt them for any subsequent operations.

The mechanism for driving the cutters, which revolve all the time while participating in the movements of the carriage, and also for advancing them against and withdrawing them from the fabric at each pause in the travel of the carriage will next be described.

The bevel $q$, Figs. 1 and 5, on the driving-shaft E meshes with the bevel-pinion $s$ on the lower end of the shaft $t$, which is carried by the vibrating yoke P, arranged to swing freely on the driving-shaft E. At its upper end the shaft $t$ is similarly connected to the shaft $u$, mounted on the carriage O by means of the bevels $q'\ s'$ and the vibrating yoke P'. The shaft $t$ is provided with a splined extension-joint $t'$. Provision is thus made for transmitting continuous rotary motion from the driving-shaft E to the shaft $u$, traveling with the carriage O, during its reciprocating movements. The motion of the shaft $u$ is transmitted to the shafts $r\ r'$ of the cutters B B' by the belts or chains Q Q', running on suitable pulleys or sprockets on the shaft and around the pulleys or sprockets $v\ v'$, Fig. 4, on the cutter-shafts. I prefer to use chains for this transmission, since by their use the knives if properly set relative to each other will never strike. The shafts $r\ r'$ are provided with splines $w\ w'$, Fig. 4, sliding in grooves in the interior of the bosses of the sprockets $v\ v'$, so that the shafts $r\ r'$ may be shifted axially through the sprockets while revolving with them. The sprockets are supported by suitable brackets attached to the outer ends of the journal-boxes on the carriage. The shafts $r\ r'$ revolve in the sleeves $x\ x'$, Fig. 4, which are arranged to slide to and fro lengthwise in the boxes on the carriage, so as to impart to the revolving cutters the inward and outward movements requisite to making the circular cuts and for withdrawing the cutters, so as to permit the next movement of the carriage or the feed movement of the fabric. Collars $y\ y'$ at one or both ends of these sleeves compel the shafts to partake of the motions of the sleeves.

The reciprocating movements of the cutter are produced from the shaft R, Figs. 1 and 2, which is provided with the cams $z\ z'$, which operate the levers S S'. The shaft R makes one revolution at each pause in the movement of the table, being driven from a clutch on the shaft of the gear G by the oscillating shaft $u'$, said clutch being controlled by the table, as hereinafter described.

The mechanism for reciprocating the table and arresting its movements at the proper points, so that the cutters can cut the rings from the fabric, will be understood from Figs. 1, 2, 6, and 7. A friction-driven wheel U, Fig. 1, engages with a rack $l'$ on the carriage O, either directly or through the idler-gear V, and imparts to it the reciprocating movements. The gear U is driven from a sprocket Z, Figs. 1, 2, and 5, attached to the gear G by the chain T, running over the sprocket W. These parts run all the time in one direction, and the motion of the friction-gear U is reversed by the intermediate gearing and clutches represented in plan view in Fig. 7. $f'$ represents friction-disks between collars on the shaft X and the gear U, a nut $f^2$ or other suitable device being employed to regulate the friction. The sprocket W drives the shaft $g'$, supported in suitable brackets between the frames and which carries the gears $g^2 g^3$. The gear $g^2$ meshes with the gear $h'$, which drives the clutch $i$, attached to it, in one direction. The opposite clutch $i^2$ is driven in the other direction by the gears $g^3$, $l^2$, and $l^3$ on the shaft $m'$ and gear $l^4$, turning on the shaft X. Between the clutches $i'$ $i^2$ is placed the movable clutch member $i^3$, which is splined on the shaft X. Any suitable mechanism operated by the reciprocation of the table at the end of its movements may be employed to shift the movable clutch member $i^3$ into or out of engagement with the clutches $i'$ $i^2$, so as to reverse the direction of the rotation of the shaft X and the friction-gear U, and consequently to produce the to-and-fro motion of the table. In the particular construction shown the table O is provided with the projecting bosses $c^2$ $d^2$, which may be adjustable lengthwise and which come in contact with the lever $E'$, Figs. 1, 2, and 6, on the rock-shaft $F'$, provided with the arm $F^2$, which by the rod $F^3$ operates the bell-crank $H'$, Fig. 7, which shifts the movable clutch member $i^3$. The lever $H'$ is pivoted at $j'$ to a bracket on one of the cross-bars of the frame, the end $k'$ of the lever being preferably double, so as to form a yoke engaging with the pins $o^2$ above and below the clutch member. These pins are inserted in a ring in a groove in the member $i^3$, so that the latter turns freely. The ends $k'$ of the lever are provided with slots $r^2$, so that the lever can make half its movement in either direction before shifting the clutch member $i^3$. A roller $s^2$, Fig. 7, on the other end of the lever $H'$ comes in contact with a sliding conically-ended pin $u^2$, pressed inward in a suitable guide by the spring $v^2$, so that the movable clutch member is held in engagement with one or the other of the clutches. As the roller $s^2$ reciprocates it presses the pin $u^2$ outward until it has passed the point of the cone on the inner end of the pin, compressing the spring $v^2$; but after it has passed the point the spring forces the pin inward and insures and continues the engagement of the clutches. The sliding movement of the pin $u^2$ is also utilized to set the clutch Y, Figs. 2 and 5, into operation to start the feed of the fabric from one row of rings to the next by the connection $a^2$, Figs. 1 and 5.

The clutch Y consists of a continuously-revolving member provided with suitable teeth and attached to the gear G, which is supported on a suitable transverse shaft. The movable member $k^2$ of the clutch is provided with suitable teeth and the cam-groove $o^3$. One or more springs $p^2$, Fig. 5, urge the movable member $k^2$ constantly toward the other member; but they are held out of engagement with each other, except at the time of the feeding of the fabric, by the sliding bar $q^2$ and the pivoted latch $m^2$, which carries the roller $n^2$, engaging with the cam-groove $o^3$. The latch is pivoted at $w^2$, and on one side it is provided with a notch $x^2$, which receives the end of the sliding bar $q^2$, when the clutch is engaged. Thus if the bar $q^2$ be moved from left to right in Fig. 5 its end $y^2$ slides off the edge of the notch $x^2$ and the springs $p^2$ force the clutch, the roller, and the latch inward, so that the teeth of the clutch members are engaged and the clutch and the crank H make one revolution, which movement produces the fabric-feed, as already explained, as shown in Fig. 5, the clutch being disengaged by the cam-groove $o^3$ acting on the roller and latch. It will be observed from Figs. 6 and 7 that the pin $u^2$ is forced outward by the movement of the table at both ends of its reciprocation. The pin $u^2$ is connected with the sliding bar $q^2$, Fig. 5, so as to move it toward the right to allow the engagement of the clutch Y, in the following manner: $M'$, Figs. 1, 3, and 7, is a bell-crank lever jointed at one end to the pin $u^2$ and at the other end to the connection $a^2$, the lower end of which is connected to the crank $z^2$ on the shaft $j^2$. The bell-crank lever $M'$ is pivoted to lugs on the frame in any suitable manner. When the pin $u^2$ is pushed outward by the roller $s^2$, the connection $a^2$ is forced downward and the rock-shaft $j^2$ is turned so that the spring-pawl $o^4$, Figs. 5 and 13, engages with the notch $a^3$ in the bar, and when the pin $u^2$ is again moved inward by the spring $v^2$ the connection $a^2$ travels upward, the shaft $j^2$ turns in the opposite direction, and the bar $q^2$ is shifted lengthwise from left to right, its end $y^2$ slipping off the edge of the notch $x^2$, allowing the latch $m^2$ to swing on its pivot and the springs $p^2$ to engage the clutch Y. $R'$ is a spring which constantly presses the bar $q^2$ from right to left, and the spring $v^2$ is made strong enough to overcome the spring $R'$ in moving the bar toward the right. As the clutch member $k^2$ revolves the cam-groove $o^3$, acting on the roller $n^2$, restores the latch to its original position (represented by the full lines in Fig. 5) and allows the spring $R'$ to push the bar $q^2$ to the left, where its end $y^2$ passes beyond the notch and locks the latch against further movement, the pawl $o^4$ having disengaged itself from the notch $a^3$ in the bar by its swinging movement, as indicated by the dotted lines in Fig. 13. As the clutch $k^2$ continues to revolve the cam-groove $o^3$, acting on the latch, draws it out of engagement with the other clutch, the crank H having now completed a revolution and made the feed of the fabric.

$d^3$, Fig. 5, is a guide for the sliding bar $q^2$. The clutch $k^2$ is provided with a transverse slot in its outer end, into which fits the lug $f^3$ on the collar $h^2$, so that the clutch and collar revolve together, although the clutch slides lengthwise of the supporting-shaft. The collar $h^2$ is connected by a sleeve with the crank H.

Figure 18:
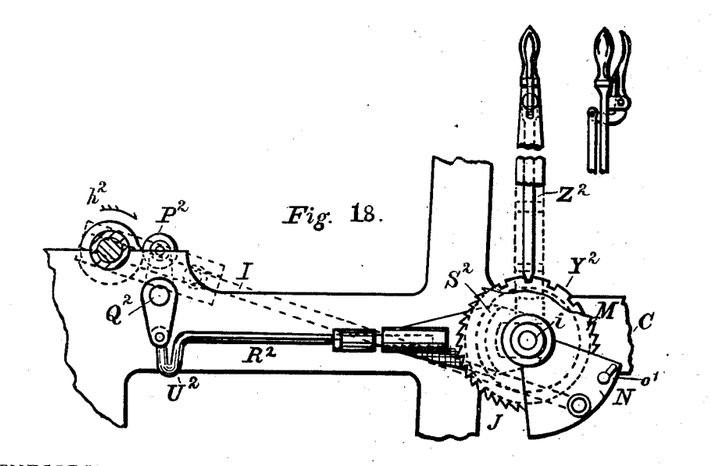
Fig. 18 represents a modification adapted to operate the fabric-feed by hand.

The brake on the fabric-feeding mechanism will be understood from Figs. 5 and 18. The collar $h^2$, which is driven by the clutch Y, is made in the shape of a cam, as indicated in Fig. 18. This cam acts during the last half of its revolution—that is, during the return or non-feeding movement of the segment N—and applies a brake to the ratchet-wheel M. The roller $P^2$ is carried by an arm on the rock-shaft $Q^2$ and by means of another arm on the rock-shaft and the adjustable connection $R^2$ draws a brake-shoe $S^2$ against a circular flange $T^2$ on the wheel M. (See Figs. 8, 9, and 10.) A spring $U^2$, Fig. 18, may be employed on the connection $R^2$.

I have thus now described how the reciprocating movement of the table O is produced from the driving-shaft E through the pinion F, the gear G, and the friction-driven gear U, with intermediate reversible transmission mechanism provided with clutches operated by the movements of the table, so that the motion of the friction-driven gear U is reversed and a to-and-fro motion transmitted from it to the table.

I will next describe the mechanism by which the carriage is stopped during its movements in either direction, so as to allow the cutters to be advanced and withdrawn to cut the rings from the fabric, it being understood that while the friction on the gear U is sufficient to move the carriage the friction will slip and the carriage remain stationary if it is positively arrested. It will be also perceived that the mechanism for stopping the carriage must be adjustable, so as to adapt the machine to cutting rings of different sizes, which will of course require movements of the carriage for different distances between each pause. For this purpose I attach to one side of the carriage a series of adjustable blocks I', Figs. 1, 2, and 6, in any suitable way, such as by the slot J', Figs. 1 and 6, and the T-headed bolts $c^3$. The beveled sliding dogs K' K² project into the path of the blocks. The distance between the blocks is equal to the distance between the centers of the rings in each row. The motion of the carriage is arrested by the blocks coming successively into contact with the dogs, the dog K' serving to arrest the table when traveling from right to left and the dog K² stopping it when going in the opposite direction. The dogs are provided with suitable springs V' V², Fig. 6, which hold them up in the path of the blocks except when they are pressed down by the blocks when traveling in the direction in which they contact with the beveled upper ends of the dogs. The dogs are arranged to slide in the adjustable supports W' W², secured by the T-headed bolts $c^4 c^4$ to the sliding bar X', attached to the frame by the clips Z'. When one of the blocks I' contacts with one of the dogs K' or K², the bar X' is moved a short distance one way or the other, according to the direction in which the table is traveling, this movement being indicated by the full and dotted lines in Fig. 6.

Figures 19, 20, 21:
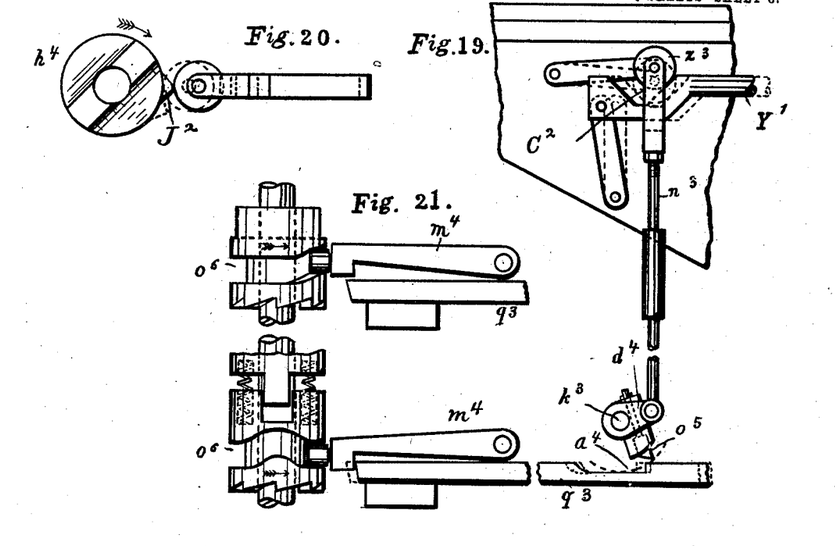
Fig. 19 represents the trip device for controlling the movements of the table.
Fig. 20 represents the cam for unlocking the dogs which arrest the movements of the table.
Fig. 21 represents one of the latches and its cam.

The advance and return of the cutters are produced from the sliding movement of the bar X' by means of the clutch A', Fig. 5, the rock-shaft $k^3$, the crank connection $n^3$, Figs. 1 and 19, and sliding rod Y'. The movement of the sliding bar X' in either direction throws in the clutch A', and this produces one revolution of the cam-shaft R on the table, by which the in and out axial movements of the revolving cutters are produced by the levers S S', Figs. 2, 16, and 17. The clutch also operates the mechanism by which the dogs K' K² are drawn downward to release the blocks, so that the carriage, driven by the friction-gear, can advance another step to move the cutters into position to cut the next ring.

Figures 16, 17:
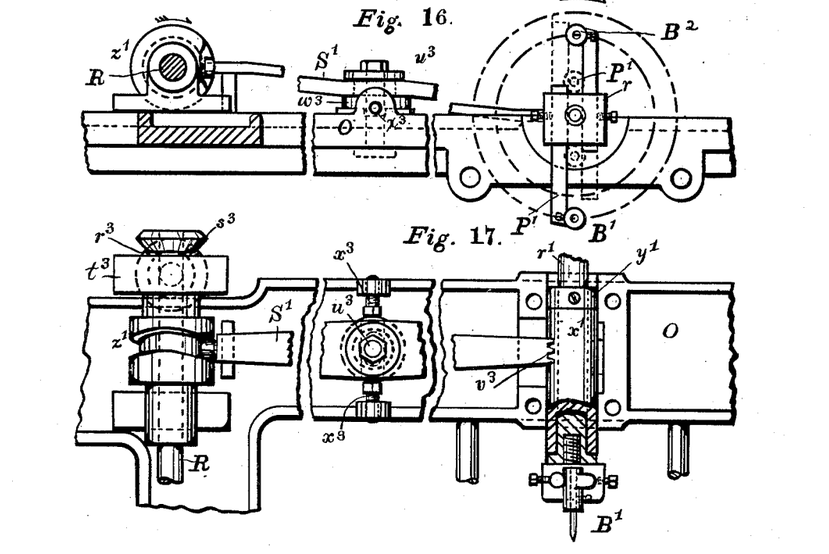
Fig. 16 is a side elevation of one of the cutters and its driving mechanism.
Fig. 17 is a plan view of the same.

I will next describe the means by which the cam-shaft R is caused to make one revolution every time the carriage is arrested. $u'$, Figs. 1, 3, and 5, is a swinging shaft provided with bevel-gears at each end and arranged to communicate motion from the gear G, through the clutch A', to the shaft R on the carriage in a manner substantially similar to that already described with regard to the shaft $t$, which transmits power to the revolving cutters. When the movable member $k^4$, Fig. 5, of the clutch A' is engaged with the corresponding clutch revolving with the gear G, the collar $h^4$ revolves, and this, through a suitable sleeve, rotates the bevel-gear $h^5$, which meshes with the bevel $h^6$ on the lower end of the upright swinging shaft $u'$. G' is a swinging support for the lower end of the shaft $u'$, arranged to swing freely about the shaft which supports the gear G and the bevel $h^5$. The shaft $u'$ thus receives rotary motion while its upper end is swinging to and fro with the reciprocation of the carriage or table. At its upper end the shaft $u'$ transmits motion to the cam-shaft R through a pair of bevel-gears and a swinging support in a manner substantially similar to that already described. A bevel-gear $r^3$, Fig. 2, is secured to the upper end of the swinging shaft $u'$, and this meshes with a bevel $s^3$ on the cam-shaft R, a vibrating support $t^3$ being placed on the shaft R, which revolves in suitable journal-boxes on the table O. $z\ z'$, Figs. 2 and 16, are cams on the shaft R, which act on rollers on the ends of the levers S S', so as to give them the requisite vibrating movements. The levers S S' are pivoted to the table at $u^3$. At their inner ends the levers S S' are provided with one or more teeth $v^3$, Fig. 17, which engage with racks formed in the sides of the sleeves $x\ x'$, (see Fig. 4,) which support the cutter-spindles $r\ r'$. The vibrations of the levers S S', imparted by the cams on the shaft R, will thus force the revolving cutters B B' into the fabric to cut the rings and also withdraw them, so that the carriage can make the step required for the next ring or to allow of the fabric-feed. The pivots $u^3$ of the levers S S' are made adjustable, so as to adapt the machine to different depths of cutting and to different thicknesses of the fabric. The pivots $u^3$ are inserted in blocks $w^3$, Fig. 16, which may be adjusted transversely by the screws $x^3$.

Figure 6:
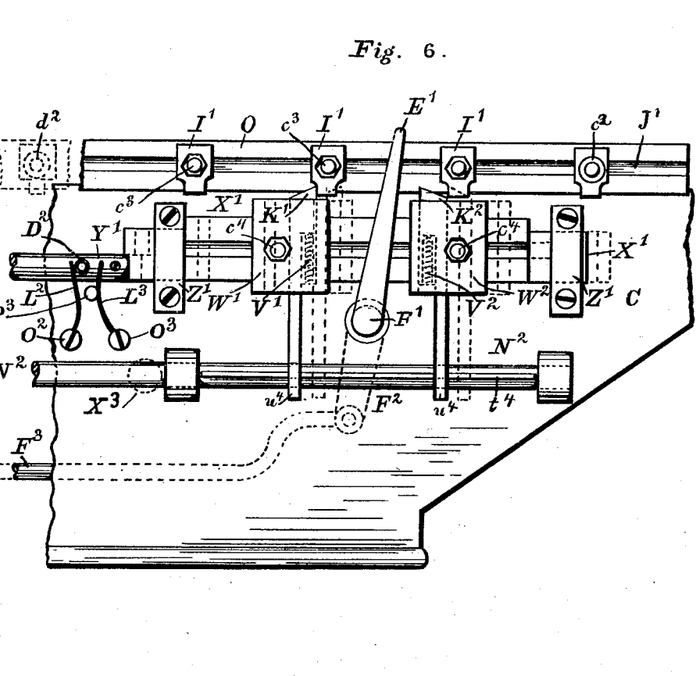
Fig. 6 is a partial front elevation showing the mechanism for controlling the movements of the table carrying the revolving cutters.
Figure 7:
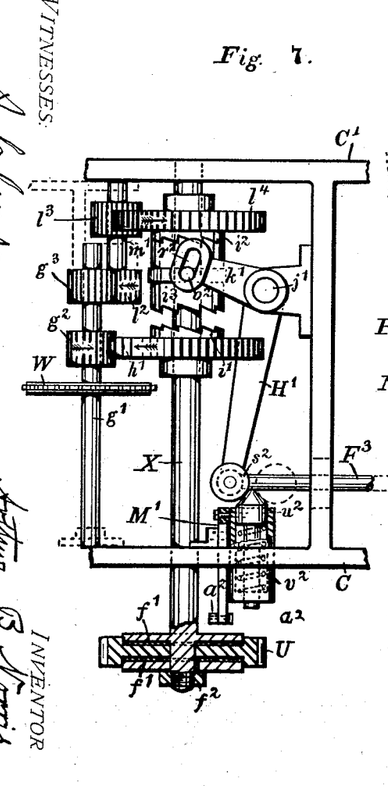
Fig. 7 is a plan view of the mechanism for reciprocating the table.

When one of the blocks I', Fig. 6, moves one of the dogs K' K², the bar X' slides lengthwise a short distance, and this movement shifts the bar $q^3$, Fig. 5, to the right, thereby allowing the latch $m^4$ to swing and the springs $p^4$ to engage the opposing members of the clutch A'. The end $y^3$ of the bar is pulled beyond the edge of the notch $x^4$ in the latch. A roller $z^3$, Fig. 19, on the upper end of the connection $n^3$ is forced upward by the inclined sides of the notch $C^2$ in the rod Y'. This action takes place in whichever direction the rod moves. The connection $n^3$ rocks the shaft $k^3$ by the crank $d^4$, and the spring-dog $o^5$, engaged in the notch $a^4$, draws the bar $q^3$ to the right. A suitable spring $e^5$ is arranged in some suitable way, such as on the shaft $k^3$, to restore the parts to position. The bar $q^3$ is constantly urged to the left by the spring R'. As the clutch member $k^4$ revolves the cam-groove $o^6$ holds the latch away from the bar until the bar has returned to its normal position, after which the latch is held from moving by the bar, and the continued rotation of the clutch disconnects it by the action of the cam-groove on the roller on the free end of the latch. (See Fig. 21.) The sliding bars $q^2\ q^3$ are connected together or interlocked, so that both of the clutches cannot be engaged at the same time. In the arrangement shown this interlocking is secured by the lever I², Fig. 5, which is pivoted at $e^4$ and is provided at each end with teeth which mesh with teeth on the sides of the bar. The construction of the spring-dogs $o^4$ and $o^5$ will be understood from Fig. 13. They are arranged within suitable blocks on their respective shafts and pressed outward by springs.

A cam J², Fig. 20, on the collar $h^4$ serves to withdraw the dogs K' K² after each pause in the motion of the table. The cam J², Fig. 20, pushes the roller $f^4$ on the slide $f^5$ outward, and this, acting through the latch $f^6$ and the arm $i^4$, moves the rock-shaft $r^4$, which by the crank $m^3$ pulls down the connection S⁴, which rocks the shaft N², Figs. 1, 3, 4, and 6, which is provided with a rib $t^4$, which engages with lugs $u^4$ on the lower ends of the dogs. This movement occurs at the end of the revolution of the clutch member $k^4$ and after the in-and-out axial motion of the cutters. A spring $f^7$, Fig. 5, restores the slide and roller to normal position.

In order to keep the bar X' central between the clips Z Z', I employ a spring or springs in any suitable location or arrangement. Thus, as represented in Fig. 6, a stud D² on the rod Y' or the bar X' bears against the springs secured to the frame in the bosses O² O³ and arranged to return the dogs to central position from either direction. A stop P³ limits the motion of the springs toward each other. Any other suitable arrangement of a centering spring or springs may be adopted.

Figure 22:
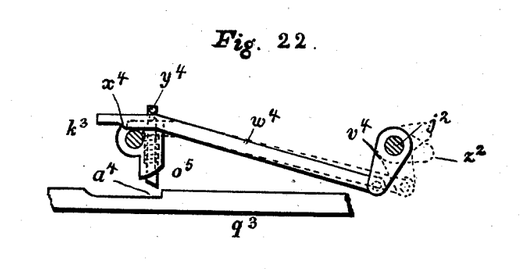
Fig. 22 represents the interlocking device for the clutches.

Provision is made for preventing the two dogs $o^4$ and $o^5$ from becoming engaged with their respective bars at the same time by the device shown in Figs. 5 and 22. The shaft $j^2$ is prolonged, and the crank $v^4$ is secured on its inner end. The connecting-rod $w^4$ is pivoted to the crank and extends over the shaft $k^3$, on which it rests. $y^4$ is a pin in the dog $o^5$, which bears on the upper side of the rod. As the crank $v^4$ swings it moves the rod forward and back, and an inclined surface $x^4$ on the lower side of the rod raises or lowers the end of the rod, acting on the shaft $k^3$, as indicated by the full and dotted lines in Fig. 22. When the rod is pushed toward the left, its end rises and holds up the dog $o^5$, so that it cannot engage with the notch $a^4$. On moving the rod to the right the dog is forced downward by the spring on it. As the dog $o^4$ is on the shaft $j^2$, the movement of the shaft in this manner controls the position of the dog $o^5$, and when one dog is engaged with the notch in its bar it is impossible that the other should be engaged with the notch in its bar.

The construction of the fabric-clamping device will be understood from Figs. 4 and 14. A stationary ring T' is arranged on one side of the fabric in contact therewith immediately outside the revolving cutters. This ring or clamp is supported from the table by the rods $z^4$, three of these rods being preferably employed. On the opposite side of the fabric is placed the movable ring-clamp U', being pressed against the fabric every time the cutter advances by the spring X², Fig. 4. The ring U' is supported by the rods $c^6$, which slide in ways $e^6$, the rods being connected together by the bar $i^5$. The sleeve $x'$, which supports the cutter-spindle, is provided with a collar $l^5$, Fig. 4, which bears against the bar $i^5$, so that every time the cutter is withdrawn the ring is moved away from the fabric and the spring compressed. The sleeve passes through an opening in the bar. When the cutter is again advanced and acts on the fabric, the spring forces the ring U' into contact with the fabric, so that the latter is firmly held during the cutting operation.

In order to operate the fabric-feed by hand, a toothed wheel Y², Fig. 18, is placed on the feed-shaft $i$, and a handle Z², with a pawl, is arranged to operate it, the pawls $l$ being thrown out, if necessary.

Instead of the chains Q Q' shafts and bevel-gears may be employed for driving the cutters.

Figure 11:
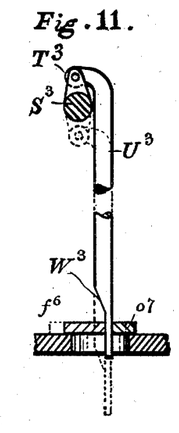
Fig. 11 represents a portion of the stop mechanism for throwing out of action the reciprocating movement of cutter, spindles, and the travel of the table.

In order to stop the traveling motion of the table, a knob or handle V³, Fig. 1, is employed on the end of a shaft S³, Fig. 11, provided with a crank T³, to which is pivoted a rod U³, terminating in a wedge W³, which may be interposed between latch $f^6$ and the bell-crank lever $o^7$, Fig. 5, which is interlocked by suitable teeth with the bar $q^8$. When the wedge W³ is in its elevated position, the spring on the latch $f^6$ draws it out of engagement with the sliding bar $f^5$, and consequently the table-feed is thrown off. A handle X³, Fig. 6, may be applied to the rock-shaft N² to start the table-feed at any time desired, the wedge W³ being then depressed.

Fig. 12 represents in section a spring connection Y³, which may be employed on the rods $a^2$ and $n^3$. This permits a slight amount of extension in the lengths of the rods for the adjustment of the parts or for compensation for wear.

In Fig. 16 I have represented two cutters B' B² at different distances apart on the same side of the fabric. These cutters are adjustable for cutting rings of different sizes.

It will be understood that many alterations and rearrangements of the operative parts of my invention may be adopted without departure from the leading principles thereof.

I claim—

1. The combination with the intermittently-acting fabric-feeding mechanism, of the axially-movable revolving cutter, the intermittently-traveling table carrying the cutter, and mechanism adapted to advance and return the cutter axially during the pauses in the movement of the table, as and for the purposes described.

2. The combination with the intermittently-acting fabric-feeding mechanism, of the axially-movable revolving cutters, one on each side of the fabric, the intermittently-traveling table carrying the cutters, and mechanism adapted to advance and return the cutters axially during the pauses in the movement of the table, as and for the purposes described.

3. The combination with the intermittently-acting fabric-feeding mechanism, of the axially-movable revolving cutter, the intermittently-traveling table carrying the cutter, and mechanism adapted to advance and return the cutter axially during the pauses in the movement of the table, and means for arresting the movement of the table, as and for the purposes described.

4. The combination with the intermittently-acting fabric-feeding mechanism, of the axially-movable revolving cutter, the intermittently-traveling table carrying the cutter, means for driving the cutter, mechanism adapted to advance and return the cutter axially during the pauses in the movement of the table, and means for stopping the axial movement of the cutter without arresting the traveling table, as and for the purposes set forth.

5. The combination with the intermittently-acting fabric-feeding mechanism, of the axially-movable revolving cutters, one on each side of the fabric, the intermittently-traveling table carrying the cutters, the fabric-clamping mechanism, and mechanism adapted to advance and return the cutters axially and to operate the clamp during the pauses in the movement of the table, as and for the purposes described.

6. The combination with the intermittently-acting fabric-feeding mechanism, of the axially-movable revolving cutters, one on each side of the fabric, the intermittently-traveling table carrying the cutters, the fabric-clamping mechanism, mechanism adapted to advance and return the cutters axially and to operate the clamp during the pauses in the movement of the table, and means for stopping the axial movements of the cutters and the operation of the clamp without arresting the traveling table, as and for the purposes described.

7. The combination with the revolving cutter, having intermittent axial and traveling movements, of the variable fabric-feeding mechanism, comprising the adjustable crank, the connection, the ratchet and pawl, and suitable fabric-feeding rollers, as and for the purposes set forth.

8. The combination with the revolving cutter, having an intermittent axial movement, of the intermittently-traveling table supporting the cutter, and the variable fabric-feeding mechanism, comprising the adjustable crank, the connection, the ratchet and pawl, suitable fabric-feeding mechanism and the clutch operated by the traveling table at either end of its movement, as and for the purposes described.

9. The combination with the revolving cutter, having an intermittent axial movement, of the intermittently-traveling table supporting the cutter, the friction-gear for operating the table and mechanism for reversing the gear at either end of the movement of the table, as and for the purposes described.

10. The combination with the revolving cutter, having an intermittent axial movement, of the intermittently-traveling table supporting the cutter, the reversible friction-gear for moving the table, the clutch operated by the table at either end of its movement, and the two trains of gearing for transmitting movement in either direction to the friction-gear, as and for the purposes described.

11. The combination with the revolving cutter, having an intermittent axial movement, of the intermittently-traveling table, supporting the cutter, the adjustable blocks attached to the table, the movable dogs or stops for arresting the table, the friction-gear for operating the table, and mechanism for reversing the gear at either end of the movement of the table, as and for the purposes described.

12. The combination with the revolving cutter, having an intermittent axial movement, of the intermittently-traveling table supporting the cutter, the adjustable blocks attached to the table, the movable stops for arresting the table, mechanism for reversing the gear at either end of the movement of the table, and mechanism adapted to produce the axial movement of the cutter at each pause in the travel of the table, as and for the purposes set forth.

13. The combination with the intermittently-acting fabric-feeding mechanism, of the axially-movable revolving cutter, the intermittently-traveling table carrying the cutter, means for arresting the travel of the table at designated points, mechanism for producing the axial movement of the cutter during the pauses in the movement of the table, and mechanism for producing the fabric-feed at either end of the reciprocation of the table, as and for the purposes set forth.

14. The combination with the intermittently-acting fabric-feeding mechanism, of the axially-movable revolving cutter, the intermittently-traveling table carrying the cutter, the adjustable blocks attached to the table, the movable dogs or stops for arresting the table, the friction-gear for operating the table, mechanism for reversing the gear at either end of the movement of the table, mechanism adapted to produce the axial movement of the cutter at each pause in the travel of the table, and means for operating the fabric-feeding mechanism at the ends of the reciprocating movements of the table, as and for the purposes set forth.

15. The combination with the intermittently-acting fabric-feeding mechanism, of the axially-movable revolving cutter, the intermittently-traveling table carrying the cutter, the clutches arranged to be actuated from the table for operating the cutter axially and the fabric-feed, and the reversible friction-gear for moving the table in either direction, as and for the purposes described.

16. The combination with the intermittently-acting fabric-feeding mechanism, of the axially-movable revolving cutter, the intermittently-traveling table carrying the cutter, the clutches arranged to be actuated from the table for operating the cutter axially and the fabric-feed, the reversible friction-gear for moving the table in either direction, and suitable interlocking mechanism between the clutches, whereby both cannot be engaged at the same time, as and for the purposes described.

17. The combination with the driving-shaft of the intermittently-traveling table carrying the axially-movable revolving cutter, and the mechanism for revolving the cutter consisting of the swinging shaft connected with the driving-shaft at one end and to a shaft on the table at the other, and provided with bevel-gears at each end, as and for the purposes described.

18. The combination with the driving-shaft of the intermittently-traveling table carrying the axially-movable cutter, reversible mechanism for reciprocating the table, means for arresting the table at designated points, mechanism for revolving the cutter on the traveling table comprising a swinging shaft provided with bevel-gears at each end, mechanism for moving the cutter axially comprising a swinging shaft provided with bevel-gears at each end driven from the driving-shaft by a secondary transmission, a clutch on the secondary transmission, and means operated by the table for engaging the clutch at each pause in the reciprocation of the table, as and for the purposes described.

19. The combination with the intermittently-acting fabric-feeding mechanism of the intermittently-traveling table carrying the axially-movable revolving cutter, mechanism for driving the revolving cutter, mechanism for producing the axial movement of the revolving cutter, mechanism for operating the fabric-feed at the ends of the reciprocation of the table, and means for throwing off the fabric-feed, as and for the purposes described.

20. The combination with the intermittently-acting fabric-feeding mechanism, of the intermittently-traveling table carrying the axially-movable revolving cutter, mechanism for driving the revolving cutter, mechanism for producing the axial movement of the revolving cutter, mechanism for operating the fabric-feed at the ends of the reciprocation of the table, and means for stopping the axial movement of the cutter, as and for the purposes described.

21. The combination with the intermittently-acting fabric-feeding mechanism, of the intermittently-traveling table carrying the axially-movable revolving cutter, mechanism for driving the revolving cutter, mechanism for producing the fabric-feed at the ends of the reciprocation of the table, means for throwing off the fabric-feed, and means for stopping the axial movement of the cutter, as and for the purposes described.

22. The combination with the intermittently-acting fabric-feeding mechanism, of the intermittently-traveling table carrying the axially-movable revolving cutter, mechanism for revolving the cutter and actuating it axially, the blocks attached to the table, the movable and yielding spring dogs or stops for arresting the table, mechanism operated from the dogs for producing the axial movement of the cutter, and means for withdrawing the dogs, as and for the purposes set forth.

23. The combination with the main frame having a lateral extension supporting the driving-shaft and the secondary transmission and provided with ways of the reciprocating intermittently-traveling table mounted on the ways and carrying the axially-movable revolving cutter, the fabric-feeding rollers supported in the frame and in an extension at one side of the table, mechanism for reciprocating the table and arresting it at designated points, mechanism for operating the revolving cutter axially at each arrest of the table, and mechanism for operating the fabric-feed at the ends of the reciprocation of the table, as and for the purposes described.

ARTHUR B. NORRIS.

Witnesses:
C. G. CRANNELL,
GEO. B. SELDEN.